United States Patent Office 3,207,696
Patented Sept. 21, 1965

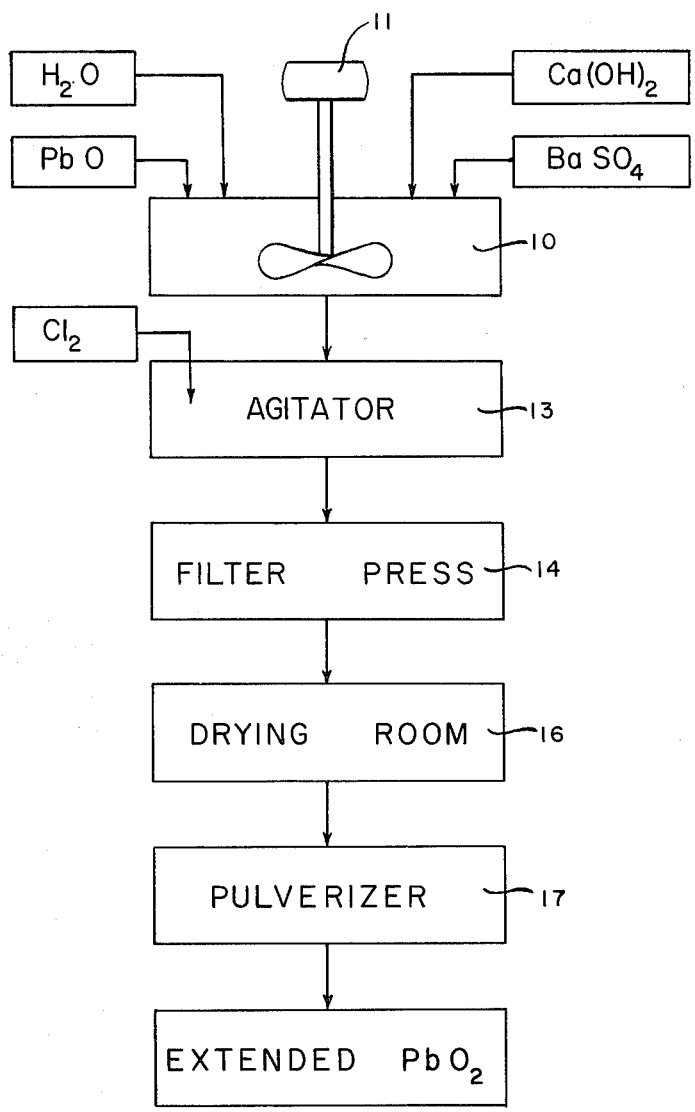

3,207,696
COMPOSITION AND METHOD OF FORMING AN EXTENDED LEAD DIOXIDE ACTIVATOR
John F. Shepherd, Cincinnati, and Clark L. Bachler, Indian Hill, Ohio, assignors to The Shepherd Chemical Company, Cincinnati, Ohio, a corporation of Ohio
Filed Jan. 18, 1963, Ser. No. 252,450
6 Claims. (Cl. 252—186)

This invention relates to activators for use in polymerization of polysulfide resins and related resins.

In polymerization or curing of polysulfide and related resins, an oxygen-donating material such as lead dioxide (lead peroxide) hereinafter designated as an activator, is added to a liquid polymer to induce curing of the polmer. The present available types of activators tend to vary in activity. In general practice, more than a stoichiametric amount of an activator (7½% or more by weight for lead dioxide) is normally added to the liquid polymer: thus this amount (approximately 50% excess) is used to insure the proper cure. Many theories are advanced as to the reasons for this necessary excess, such as limited surface area available, particle size distribution, amounts and types of impurities aiding reaction interference, and type of surface area.

An object of this invention is to standardize activators for use as curing agents for polysulfide and related resins, having a reproducible reaction rate and utilizing the total amount of the oxygen-donating material.

A further object of this invention is to coat or impregnate an inert carrier with an activator possessing the ultimate amount of surface area of the oxygen-donating material.

A further object of this invention is to utilize the maximum amount of the oxygen-donating activator for the curing reaction.

A further object of this invention is to predetermine and reproduce activators rendering uniform and consistent curing rates.

A further object of this invention is to distribute the activator on an inert carrier in such a manner that will provide the maximum surface area in comparison to conventional types, to utilize the total amount thus reducing the excessive amount normally used for the curing reaction.

A further object of the invention is to improve the normally available activators for increased, uniform, consistent, and complete reaction curing efficiency.

A further object of this invention is to provide activators with which a lesser amount of oxygen donating material approaching the stoichiometric proportion is required for the same curing rate and result due to a greater surface area than that required of the normally available activators.

A further object of this invention is to provide activators for use with polysulfide and related resins to provide a lighter and more desirable resultant resin color than is possible with normally available activators.

A further object of this invention is to provide such a carrier-supported activator which is substantially completely utilized in the curing reaction.

A further object of this invention is to provide such an activator which is deposited on particles of an inert carrier so that the exposed area of the activators is extended and to a method of depositing such an activator on an inert carrier.

In the formation of our improved activators, a water slurry is prepared of an inert carrier of predetermined particle size and then the the oxygen donating material is prepared in any of the known or accepted methods of manufacture and in which process the oxygen donating material is coated or deposited on the carrier thereby controlling the particle size of the resultant material.

The process of forming the extended activator is illustrated schematically in the drawing. In a mixing tank 10, powdered litharge (PbO), powdered lime (Ca(OH)$_2$), and powdered barium sulphate (BaSO$_4$) are mixed with water to form a slurry. An agitator 11 mixes the powdered solids with the water to form the slurry. The slurry is transferred to a turbo-agitator 13, and chlorine gas is bubbled into the slurry to oxidize litharge and deposit PbO$_2$ on the particles of a BaSO$_4$ carrier. The oxidized slurry is then passed to a filter press 14 which separates the extended lead dioxide from the liquid of the slurry. The extended lead dioxide is then washed, dried in a drying room 16, and agglomerations of particles are broken up in a pulverizer 17 to form a powdered extended lead dioxide activator.

The following examples are given to illustrate the invention in greater detail but it is to be understood that the examples are given primarily by way of example rather than by way of limitation, except as set forth in the claims. In the following examples and in the remainder hereof, all parts or percentages are given by weight.

*Example 1*

To 1270 parts of water at room temperature were added in the order given 90 parts of finely divided commercial barium sulphate, 48 parts of lime (Ca(OH)$_2$), and 127 parts of commercial litharge (PbO). The water and solids were mixed to form a slurry. Chlorine gas was bubbled into the slurry while agitation was continued until 41 parts of chlorine gas had been added over a period of 1½ hours. The slurry was allowed to stand overnight. The solids were filtered out, washed and dried at 230° Fahrenheit to yield 243 parts of the improved lead dioxide activator. Analysis showed that the product included 52.6% lead dioxide and that 95.2% of the lead dioxide had been converted to lead dioxide. The agglomerates were broken up resulting in an average particle size of 0.31 micron. 6 parts of the improved activator were intimately mixed with 4 parts of di-butyl phthalate to make 10 parts of plasticized activator and the 10 parts of plasticized activator were intimately mixed with 90 parts of commercial liquid polysulfide resin, and the resin set to a tack-free mass in 11.8 minutes.

*Example 2*

To 1270 parts of water at room temperature were added in the order given 90 parts of finely divided commercial barium sulphate, 48 parts of commercial lime (Ca(OH)$_2$), and 127 parts of commercial litharge (PbO). Chlorine gas was bubbled into the slurry while agitation was continued until 41 parts of chlorine gas had been added over a period of 7 hours. The slurry was allowed to stand overnight. The solids were filtered out, washed, and dried at 230° Fahrenheit to yield 240 grams of improved lead dioxide activator. Analysis showed that the product included 59.3% lead dioxide and that 98.4% of the lead oxide had been converted to lead dioxide. The agglomerates were broken up resulting in an average particle size of 0.57 micron. 6 parts of the improved lead dioxide activator were intimately mixed with 4 parts of di-butyl phthalate to make 10 parts of plasticised activator, an the 10 parts of plasticised activator were intimately mixed with 90 parts of commercial liquid polysulfide resin, and the resin set to a tack-free mass in 15.5 minutes.

*Example 3*

To 1000 parts of water at room temperature were added in the order given 127 parts of commercial litharge (PbO) and 114 parts of concentrated nitric acid. When the litharge had dissolved, 90 parts of finely divided commercial barium sulphate were added, and the solution was agitated to form a slurry. 90 parts of 50% NaOH solution were added to cause precipitation of lead hydroxide. The solids were separated from the liquid and washed to remove salts. The washed solids were mixed with 1270 cc. of water to form a slurry. Chlorine gas was bubbled into the slurry while agitation was continued until 41 grams of chlorine gas had been added during a period of 7 hours. The slurry was allowed to stand overnight. The solids were filtered out, washed, and dried at 230° Fahrenheit to yield 235 grams of improved lead dioxide activator. Analysis showed that the product included 60.5% lead dioxide and that 99.6% of the lead oxide had been converted to lead dioxide. The agglomerates were broken up resulting in an average particle size of 0.55 micron. 6 parts of the improved lead dioxide activator were intimately mixed with 4 parts of di-butyl phthalate to make 10 parts of plasticised activator, and the 10 parts of plasticised activator were intimately mixed with 90 parts of commercial liquid polysulfide resin, and the resin set to tack-free mass in 15.5 minutes.

Lesser amounts of lead dioxide are required when these improved activators are used than are required with normally available lead dioxide activators and more reproducible results are obtained than with ordinary lead dioxide activators.

The invention has been described particularly with reference to use of barium sulphate as the inert carrier, but other inert carriers such as talc, silica, diatamaceous earth, aluminum and magnesium oxides, and clays or the like can be used instead of the barium sulphate.

The invention has been described particularly with reference to oxidation of lead monoxide and lead hydroxide using chlorine, but other lead compounds such as lead carbonate and red lead ($Pb_3O_4$) can be used instead of lead monoxide and lead hydroxide, and other oxidizing agents such as bromine and the like can be used instead of chlorine.

The improved activators can be used in the curing not only of polysulfide resins but also of other resins requiring an oxygen-donating activator.

Other changes and revisions of the claimed method and activators will be apparent to those skilled in the art, but it is not intended that the invention be limited, except as set forth in the appended claims.

Having described our invention, what we claim as new and desire to secure by Letters Patent is:

1. A method of forming an extended lead dioxide activator which comprises forming a slurry of finely divided lead monoxide and finely divided barium sulphate in water, passing chlorine gas into the slurry to oxidize the lead monoxide to lead dioxide until substantially all the lead monoxide is converted into lead dioxide, the ratio of lead monoxide to barium sulfate being such that the lead dioxide activator contains from about 52.6% to about 60.5% lead dioxide by weight, separating solids from the liquid, and drying the solids to form an extended lead dioxide activator.

2. A method of forming an extended lead dioxide activator which comprises forming a slurry of finely divided lead carbonate and finely divided barium sulfate in water, oxidizing the lead carbonate until substantially all the lead carbonate in the slurry is converted into lead dioxide to form an extended lead dioxide activator, the ratio of lead carbonate to barium sulfate being such that the lead dioxide activator contains from about 52.6% to about 60.5% lead dioxide by weight, separating the extended lead dioxide activator from the water, and drying the activator.

3. A method of forming an extended lead dioxide activator which comprises forming a slurry of finely divided red lead and finely divided barium sulfate in water, oxidizing the red lead until substantially all the red lead in the slurry is converted into lead dioxide to form an extended lead dioxide activator, the ratio of red lead to barium sulfate being such that the lead dioxide activator contains from about 52.6% to about 60.5% lead dioxide by weight, separating the extended lead dioxide activator from the water, and drying the activator.

4. A method of forming an extended lead dioxide activator which comprises forming a slurry of finely divided lead hydroxide and finely divided barium sulfate in water, oxidizing the lead hydroxide until substantially all the lead hydroxide in the slurry is converted into lead dioxide to form an extended lead dioxide activator, the ratio of lead hydroxide to barium sulfate being such that the lead dioxide activator contains from about 52.6% to about 60.5% lead dioxide by weight, separating the extended lead dioxide activator from the water, and drying the activator.

5. An extended lead dioxide activator which consists essentially of finely divided barium sulfate and lead dioxide precipitated on particles of the barium sulfate, substantially 52.6% to 60.5% thereof by weight being lead dioxide.

6. A method of forming an extended lead dioxide activator which comprises forming a slurry in water of finely divided barium sulfate and a lead compound selected from the group consisting of lead monoxide, lead carbonate, red lead, and lead hydroxide, oxidizing the lead compound until substantially all the lead compound in the slurry is converted to lead dioxide to form an extended lead dioxide activator, the ratio of lead compound to barium sulfate being such that the lead dioxide activator contains from about 52.6% to about 60.5% lead dioxide by weight, separating the activator from the water, and drying the activator.

References Cited by the Examiner

UNITED STATES PATENTS

| 2,338,119 | 1/44 | Kroenig et al. | 252—440 XR |
| 2,929,794 | 3/60 | Simon et al. | 260—79.1 |
| 2,957,845 | 10/60 | Wesp | 260—79.1 XR |
| 3,046,248 | 7/62 | Molnar | 260—79.1 XR |

FOREIGN PATENTS 607,044   8/48   Great Britain.

OTHER REFERENCES

"Catalysis," by Berkman et al., Reinhold Pub. Co, (1940), pages 426, 440, 441, 442.

JULIUS GREENWALD, *Primary Examiner.*